US012233021B2

(12) United States Patent
Beck et al.

(10) Patent No.: US 12,233,021 B2
(45) Date of Patent: Feb. 25, 2025

(54) SYSTEM AND METHOD FOR SEALING COMPONENTS IN A SPA SHELL

(71) Applicant: BULLFROG INTERNATIONAL, LC, Herriman, UT (US)

(72) Inventors: Taylor Beck, Lehi, UT (US); Nathan Tulett, Cleveland, OH (US); Todd Anderson, Lehi, UT (US); Eric Hales, Eagle Mountain, UT (US); Mark McLane, Lehi, UT (US)

(73) Assignee: Bullfrog International, LC, Herriman, UT (US)

( * ) Notice: Subject to any disclaimer, the term of this patent is extended or adjusted under 35 U.S.C. 154(b) by 0 days.

(21) Appl. No.: 17/579,838

(22) Filed: Jan. 20, 2022

(65) Prior Publication Data

US 2023/0225937 A1 Jul. 20, 2023

(51) Int. Cl.
*A61H 33/00* (2006.01)

(52) U.S. Cl.
CPC ..... *A61H 33/6063* (2013.01); *A61H 33/6073* (2013.01)

(58) Field of Classification Search
CPC ...... A61H 2033/021–023; A61H 33/00; A61H 33/0087; A61H 33/02; A61H 33/026–027; A61H 33/6021–6078; A61H 33/6094; A61H 35/00–04; E03C 1/08–086; E03C 1/22; E04H 4/00; E04H 4/12; E04H 4/1236–1245; E04H 4/1281; E04H 4/14; E04H 4/169; F16L 41/14; F16L 47/28; F16L 47/30; F16L 5/00–02; F16L 5/06
See application file for complete search history.

(56) References Cited

U.S. PATENT DOCUMENTS

| | | | | |
|---|---|---|---|---|
| 6,065,161 | A | 5/2000 | Mateina et al. | |
| 6,123,274 | A * | 9/2000 | Perdreau ............ | A61H 33/6052 239/587.3 |
| 6,973,681 | B2 * | 12/2005 | Ayeni ................. | A61H 33/6063 4/541.6 |
| 8,108,955 | B2 * | 2/2012 | Yu ...................... | A61H 33/6063 4/492 |

(Continued)

FOREIGN PATENT DOCUMENTS

| | | |
|---|---|---|
| CN | 202860718 U | 4/2013 |
| EP | 0645497 B1 | 10/1997 |

OTHER PUBLICATIONS

European Search Report from related application 23152359.8-1122, issued Jun. 7, 2023.

(Continued)

*Primary Examiner* — David P Angwin
*Assistant Examiner* — Nicholas A Ros
(74) *Attorney, Agent, or Firm* — Dentons Durham Jones Pinegar; Sarah W. Matthews; Lilly Godfrey

(57) ABSTRACT

Disclosed are systems and methods for sealing components in a spa shell. A through-component body, such as a spa jet, extends from the inner side of the spa shell to an outer side of the spa shell. A retaining member includes at least one injection port, and retains the through-component body in place on the outer side of the spa shell. A sealant is injected into the at least one injection port to seal a space between the outer side of the spa shell and the through-component body.

11 Claims, 6 Drawing Sheets

(56) References Cited

U.S. PATENT DOCUMENTS

| | | | | |
|---|---|---|---|---|
| 2006/0253971 A1* | 11/2006 | Colin | A61H 33/6063 4/541.6 |
| 2008/0127407 A1* | 6/2008 | Wooten | A61H 33/6063 4/541.6 |
| 2009/0290992 A1* | 11/2009 | Long | A61H 33/6047 417/53 |
| 2012/0159701 A1* | 6/2012 | Drury | A61H 33/6063 29/428 |
| 2014/0340872 A1* | 11/2014 | Campbell | F21V 33/004 4/696 |

OTHER PUBLICATIONS

New Zealand Intellectual Property Office, "Patent examination report 1," for New Zealand Patent Application No. 796543, Jul. 11, 2024.

* cited by examiner

SYSTEM AND METHOD FOR SEALING COMPONENTS IN A SPA SHELL

TECHNICAL FIELD

The present disclosure relates generally to spa shells. More specifically, the present disclosure relates to materials and methods for sealing components in a spa shell or pool or similar structure.

BACKGROUND

Hot tubs or spas typically comprise a containment vessel with a water-impermeable interior surface that is shaped to provide for a number of seating or other internal areas of the spa. The spa shell holds water for users to enjoy, and the shell typically has one or more holes formed therein for receiving various components such as spa jets. Because through-components require holes to be formed in the spa shell, water can leak out around the components.

To prevent leaks around components, several known methods are used. For example, components such as gaskets are used. Another method uses silicone to seal gaps but the application of silicone can vary widely during manufacturing, including both missing areas that need application of silicone and application of excess silicone to other areas. Where silicone leaks out into areas of the spa that are not intended to have silicone, this requires the additional step of manual cleaning or removal of the excessive silicone applied.

A method of accurately sealing components through the shell of the spa is needed.

SUMMARY OF DISCLOSURE

According to the present disclosure, a system for sealing a through-component in a spa shell may include a through-component body, the through-component body comprising a proximal end for positioning on an inner side of the spa shell, the through-component body extending through the spa shell from the inner side of the spa shell to an outer side of the spa shell. The through-component body may also comprise a flange on the proximal end for engaging the inner side of the spa shell. The system may additionally include a through-component gasket positioned between the flange and the inner side of the spa shell, and a spacer positioned on the outer side of the spa shell, between the outer side of the spa shell and a nut. The system also includes the nut, the nut comprising a first injection port and a second injection port, the first injection port and the second injection port spaced equidistant apart from each other. In some embodiments, the nut may be for retaining the through-component body in place on the outer side of the spa shell, the first injection port may be for injecting a sealant, and the second injection port may be for venting air and sealant.

In some configurations, the through-component gasket is integral to the through-component body. The system may further include a compensation ring between the spacer and the nut.

According to another aspect, the spacer comprises a gasket with a proximal portion made of a first plastic and a distal portion made of a second plastic. In some embodiments, the first plastic may be more resilient than the second plastic, the proximal portion for interfacing against the outer side of the spa shell, and the distal portion for interfacing with the nut. The distal portion of the spacer can include an outer lip extending upwardly and forming a channel to receive a proximal flange of the nut. The spacer can also include at least one locking member to lock the nut into place against the spacer.

The system may also include a sealant, the sealant to seal a space between the outer side of the spa shell and the through-component body.

According to another aspect, a system for sealing a through-component in a spa shell comprises a through-component body, the through-component body comprising a proximal end for positioning on an inner side of the spa shell, the through-component body extending through the spa shell from the inner side of the spa shell to an outer side of the spa shell. The system may also include a retaining member, the retaining member comprising at least one injection port, where the retaining member may be for retaining the through-component body in place on the outer side of the spa shell. In some embodiments, the at least one injection port may be for injecting a sealant therein to seal a space between the outer side of the spa shell and the through-component body.

In some configurations, the through-component body comprises a flange on the proximal end for engaging the inner side of the spa shell. The system can include a through-component gasket positioned between the flange and the inner of the spa shell, and/or a spacer positioned on the outer side of the spa shell, between the outer side of the spa shell and the retaining member.

According to one aspect, the retaining member comprises at least two injection ports comprised of a first injection port and a second injection port, the first injection port and the second injection port spaced equidistant apart from each other. The retaining member may comprise a nut.

According to another aspect, a method is described for sealing a through-component in a spa shell. The method includes: forming a hole in the spa shell sized to fit a through-component body; inserting the through-component body through the hole, the through-component body passing from an inner side of the spa shell to an outer side of the spa shell; attaching a retaining member to the through-component body on the outer side of the spa shell to secure the through-component body in place, the retaining member comprising at least one injection port; and injecting an adhesive into the at least one injection port.

The method may also include attaching a retaining member that comprises a first injection port and a second injection port. In some embodiments, injecting an adhesive into the at least one injection port includes injecting an adhesive into the first injection port until the adhesive runs out of the second injection port.

The method may include inserting a spacer onto the outer side of the spa shell, between the outer side of the spa shell and the retaining member. The retaining member comprises a nut and the through-component body comprises threads, and wherein attaching a retaining member comprises threading the nut onto the threads of the through-component body. In some embodiments, injecting an adhesive into the at least one injection port comprises injecting the adhesive into a space between the outer side of the spa shell and the through-component body.

BRIEF DESCRIPTION OF DRAWINGS

The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention. The components in the drawings are not necessarily to scale relative to each other. Like reference numerals designate corresponding parts throughout the several views.

DETAILED DESCRIPTION

Figure 1:
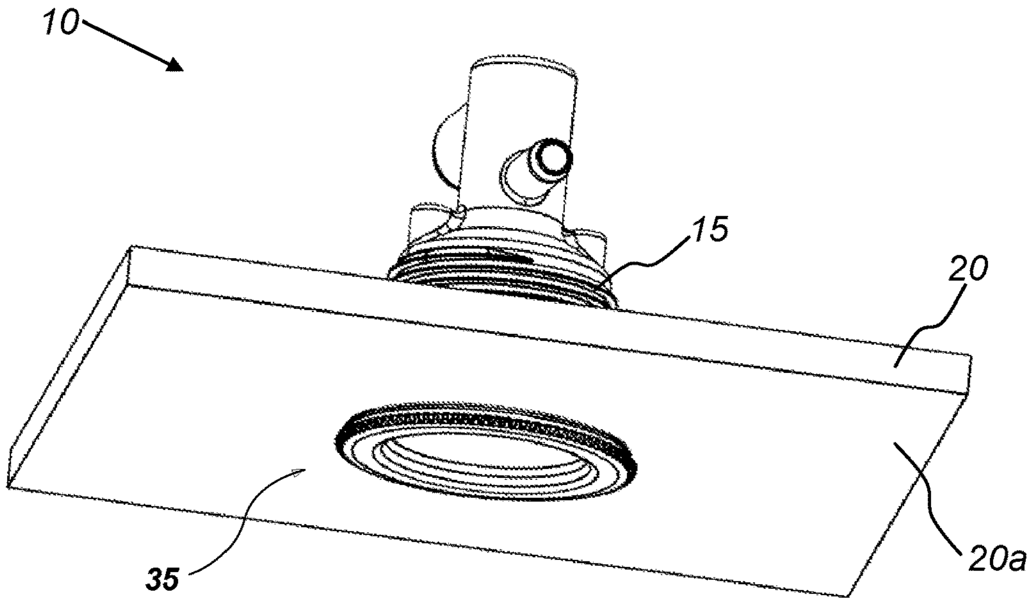
FIG. 1 is a perspective view from the inner side of the spa shell of an exemplary system for sealing a through-component body in a spa shell.

The following provides a detailed description of particular embodiments of the present invention. Reference will now be made to the drawings in which the various elements of the illustrated configurations will be given numerical designations and in which the invention will be discussed to enable one skilled in the art to make and use the invention. The description is only exemplary of the principles of the present invention, and should not be viewed as narrowing the scope of the claims which follow, which claims define the full scope of the invention.

Various aspects discussed in one drawing may be present and/or used in conjunction with the embodiment(s) shown in another drawing(s), and each element shown in multiple drawings may be discussed only once. The described features, structures, or characteristics of configurations of the invention may be combined in any suitable manner in one or more configurations. In some cases, detailed description of well-known items or repeated description of substantially the same configurations may be omitted. This facilitates the understanding of those skilled in the art by avoiding an unnecessarily redundant description. All statements herein reciting principles, aspects, and embodiments of the invention, as well as specific examples thereof, are intended to encompass equivalents thereof.

Reference in the specification to "one configuration," "one embodiment," "a configuration," or "an embodiment" means that a particular feature, structure, or characteristic described in connection with the configuration is included in at least one configuration, but is not a requirement that such feature, structure, or characteristic be present in any particular configuration, unless expressly set forth in the claims as being present. The appearances of the phrase "in one configuration" in various places may not necessarily limit the inclusion of a particular element of the invention to a single configuration, rather the element may be included in other or all configurations discussed herein.

As used in this specification and the appended claims, singular forms such as "a," "an," and "the" may include the plural unless the context clearly dictates otherwise. Thus, for example, reference to "a jet" may include one or more of such jets, and reference to "the injection port" may include reference to one or more of such ports.

As used herein, the term "generally" refers to something that is more of the designated adjective than not, or the converse if used in the negative. As used herein, the term "about" is used to provide flexibility to a numerical range endpoint by providing that a given value may be "a little above" or "a little below" the endpoint while still accomplishing the function associated with the range, for example, "about" may be within 10% of the given number or given range. As used herein, a plurality of items, structural elements, compositional elements, and/or materials may be presented in a common list for convenience. However, these lists should be construed as though each member of the list is individually identified as a separate and unique member.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 5 to about 60" should be interpreted to include not only the explicitly recited values of about 1 to about 5, but also include individual values and sub-ranges within the indicated range. Thus, included in this numerical range are individual values such as 6, 7, 8, 9, etc., through 60, and sub-ranges such as from 10-20, from 30-40, and from 50-60, etc., as well as each number individually. This same principle applies to ranges reciting only one numerical value as a minimum or a maximum. Furthermore, such an interpretation should apply regardless of the breadth of the range or the characteristics being described. Additionally, the word "connected" and "coupled" is used throughout for clarity of the description and can include either a direct connection or an indirect connection.

While methods are described herein in discrete steps in a particular order for the sake of clarity, the steps do not require a particular order and more than one step may be performed at the same time. For example, a later step may begin before earlier step completes. Or, a later step may be completed before an earlier step is started.

The present disclosure relates generally to materials and methods for spa shell reinforcement. As used herein, "spa" or "swim spa" refers to a hot tub, swim spa, pool, and/or a jetted tub, whether in ground or aboveground. It will be appreciated that while the rigidifying materials and methods described herein are described in reference to a spa, they may be similarly used in conjunction with a pool or other swimming system, or in other applications. Similarly, "spa shell" refers to the outer shell or structure of the spa, and encompasses the outer structure of a spa or any other swimming vessel, such as the outer structure of a pool, etc. Thus, "spa shell" means both the shell of a spa, the deck of a pool, and other equivalents. Similarly, a "shell" means any vessel capable of holding water. As used herein, the "inside" of the shell or spa shell is the side that faces a user and forms the layer that holds the water within the spa or other vessel. The inside of the spa shell holds water while in use. The "inner side" of the spa shell faces the inside of the of the spa shell. The "outside" or "underside" of the shell or spa shell is the side that is faced away from a user when the user is within the spa. The "outer side" of the spa shell faces the outside of the spa shell.

Figure 2:
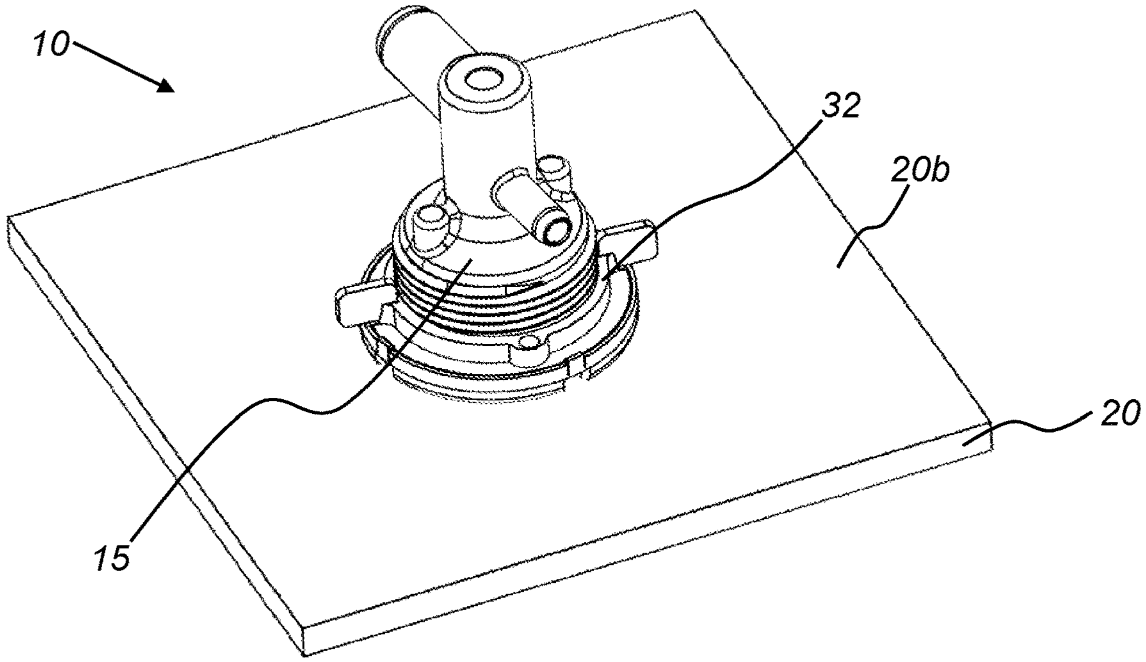
FIG. 2 is another perspective view of the system of FIG. 1 taken from the outer side of the spa shell.
Figure 3:
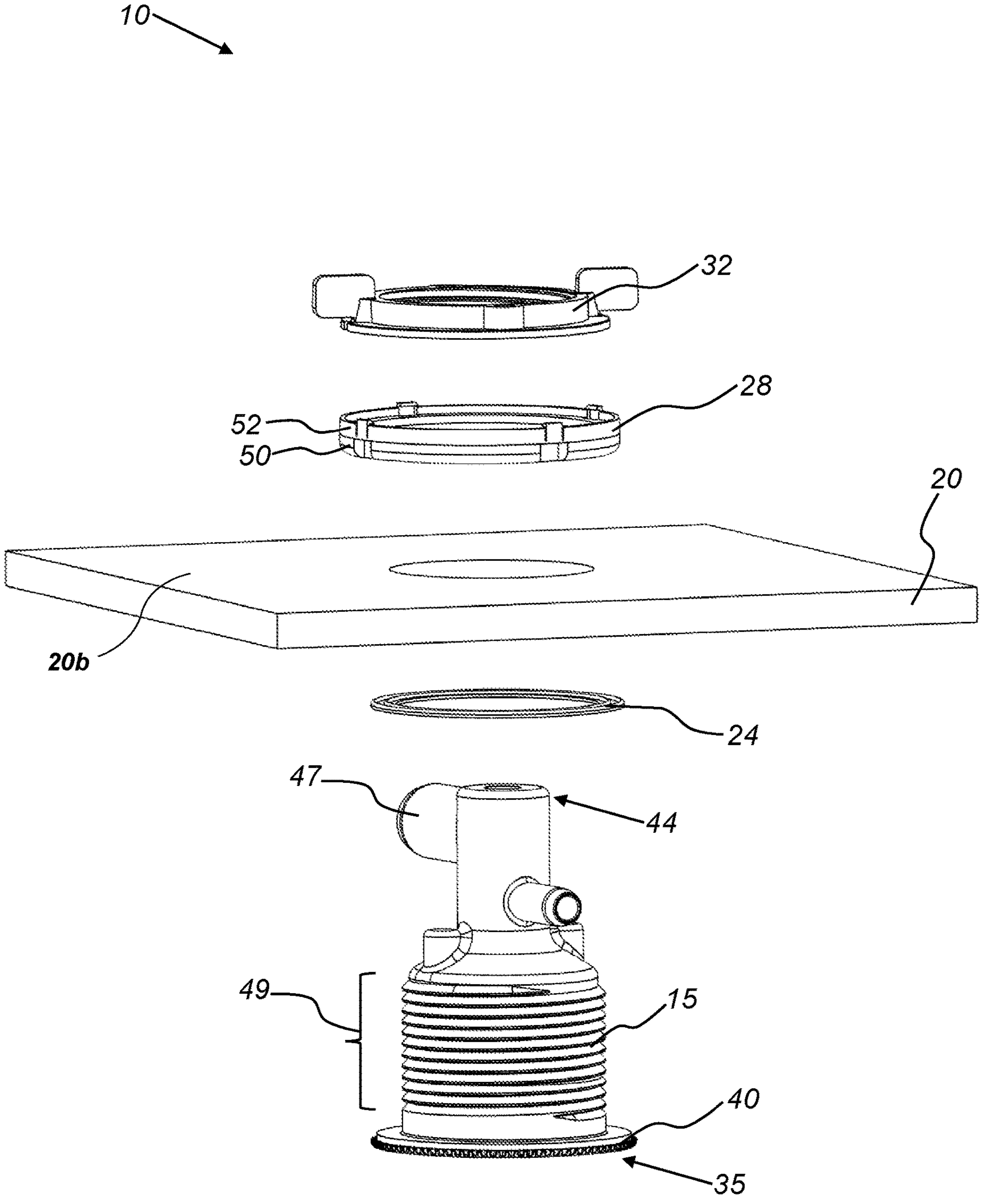
FIG. 3 is an exploded view of the system of FIG. 1.

Referring to FIGS. 1-3, an exemplary configuration of a system 10 for sealing a through-component in a spa shell may include one or more of the following components: a through-component body 15 which passes through a spa shell 20 (from the inner side 20*a* of the spa shell 20 to the outer side 20*b* of the spa shell 20); a gasket 24; a spacer 28; and a retaining member 32.

The through-component body 15 illustrated in FIGS. 1-3 is a jet body. Other through-component bodies 15 include a drain body, a suction body, and any other type of port body or other body that extends through the spa shell 20. The through-component body 15 includes a proximal end 35 for positioning on the inner side 20*a* of the spa shell 20. The through-component body 15 includes a flange 40 on the proximal end 35 to secure the through-component body 15 against the inner side 20*a* of the spa shell 20. In other configurations, the through-component body 15 does not include a flange 40, and a nut or other retaining member 32 may be used to secure the proximal end 35 of the through-component body 15 against the inner side 20*a* of the spa shell 20.

In some embodiments, the through-component body 15 also includes a distal end 44 which include one or more ports 47 for connection to tubing, etc. Between the proximal end 35 and the distal end 44, the through-component body 15 includes a threaded portion 49 (FIG. 3) for connection to a retaining member 32 on the outer side 20*b* of the spa shell, as discussed in more detail below.

The through-component body 15 may have other components integral, built-in, or otherwise connected to the through-component body 15. For example, a gasket (such as gasket 24 or another gasket) may be connected or overmolded to the inner side of the flange 40 (i.e., the side of the flange 40 that abuts the inner side 20*a* of the spa shell 20) to ensure a secure fit between the flange 40 and the inner side 20*a* of the spa shell 20. In other configurations, the gasket 24 is provided as a separate component from the through-component body 15, or a gasket 24 is not provided.

Optional gasket 24 may act as an additional seal to ensure a secure fit between the through-component body 25 and the inner side 20*a* of the spa shell 20 (such as between flange 40 of the through-component body 15). As sealant is injected from the outer side 20*b* of the spa shell 20 into the space between the through-component body 15 and the spa shell 20, as described in more detail below, gasket 24 prevents or minimizes leakage of the sealant from the outer side 20*b* of the spa shell 20 to the inner side 20*a* of the spa shell 20. The gasket 24 further prevents or minimizes leakage of the sealant past the edge of the proximal end 35 of the through-component body 15. Prior art methods of applying sealant such as silicone were known to leak past the edges of the through-component body 15 on the inner side 20*a* of the spa shell 20, requiring spa assembly workers to perform the rather difficult task of removing all excess sealant from the inner side of the spa shell 20. The system and methods described herein minimize excess sealant application to eliminate this task.

The system 10 includes one or more components to secure the through-component body 15 against the outer side 20*b* of the spa shell 20. In some configurations, a gasket or spacer 28 is positioned on the outer side 20*b* of the spa shell 20, between the outer side 20*b* of the spa shell 20 and a nut or other retaining member 32. In other configurations, a spacer 28 is not provided, and the retaining member 32 directly attaches the through-component body 15 against the outer side 20*b* of the spa shell 20.

Figure 4:
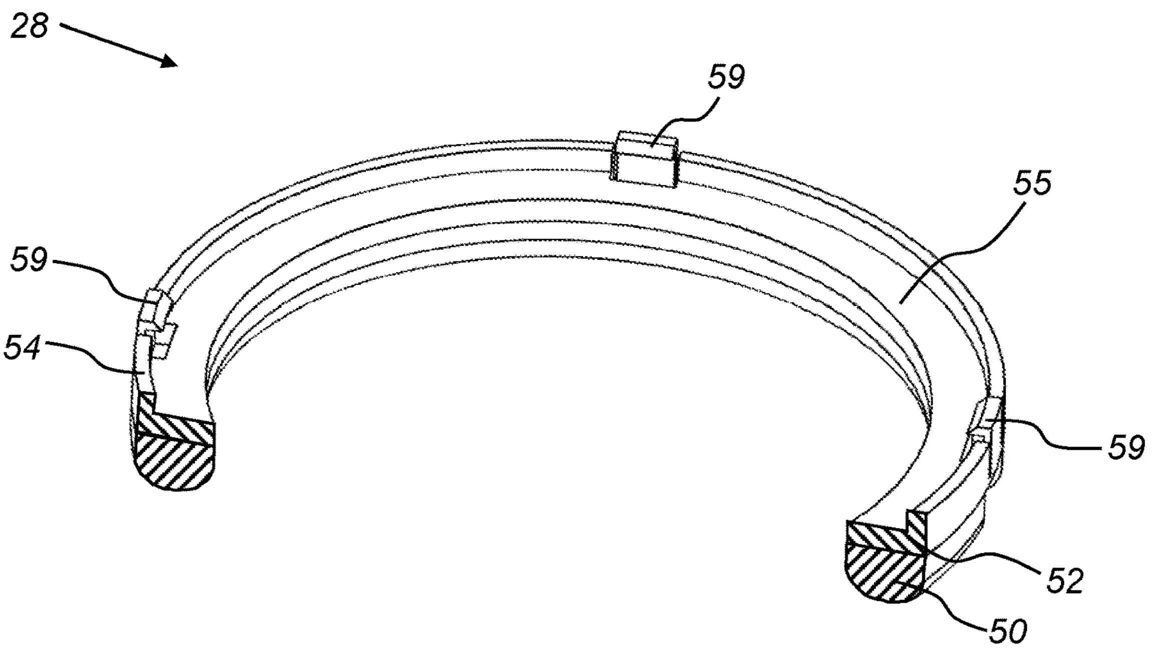
FIG. 4 is a perspective, cross-sectional view of an exemplary spacer as described herein.

Spacer 28 may help secure the retaining member 32 snugly against the outer side 20*b* of the spa shell 20. Spacer 28 may be formed from any suitable material, and may be any desired shape/configuration. A deformable or soft plastic may be used for at least part of the spacer 28. In other configurations, the spacer 28 may be formed from entirely hard or non-deformable plastic. FIG. 4 shows a cross-sectional view of an exemplary spacer 28. The spacer 28 of FIG. 4 is formed partially from a soft plastic and partially from a hard plastic. The spacer 28 may have a proximal portion 50 and a distal portion 52. A deformable, resilient, and/or soft plastic may be used to form the proximal portion 50, and a hard plastic may be used to form the distal portion 52.

The soft plastic of the proximal portion 50 sits directly against the outer side 20*b* of the spa shell 20, and resists rotation of the spacer 28 relative to the outer side 20*b* of the spa shell 20. The hard plastic of the distal portion 52 of the spacer 28 directly interfaces with the retaining member 32. The distal portion 52 of the spacer 28 includes an outer lip 54 that extends upwardly from the distal portion 52, forming an inner channel 55 to receive the proximal flange 60 of retaining member 32. In other configurations, a channel 55 is not provided.

The spacer 28 may also include at least one locking member 59 to lock the retaining member 32 into place against the spacer 28 and prevent back-out. The exemplary spacer 28 of FIG. 4 includes four locking members 59, which are resilient tabs formed in the outer lip 54 that can be pushed away to seat the retaining member 32 into the channel 55, and which push back into place over the retaining member 32 after the retaining member 32 is seated in the channel 55. More than four locking members 59 may be provided, or fewer locking members 59 may be provided, such as three, two, or one. Alternatively, no locking members 59 may be provided. With a soft plastic proximal portion 50 for engaging the outer side 20*b* of spa shell 20, and a hard plastic distal portion 52 to engage the retaining member 32, the spacer 28 may ensure that the retaining member 32 can be rotatably tightened firmly against the outer side 20*b* of spa shell 20.

Figure 5:
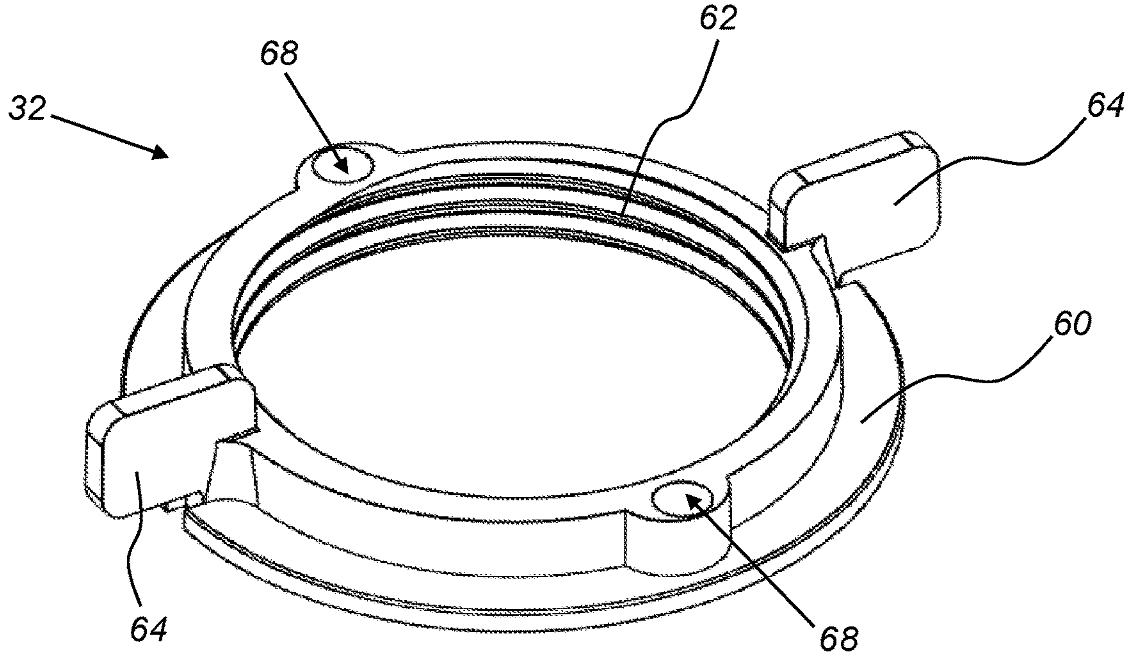
FIG. 5 is a perspective view of an exemplary retaining member as described herein.
Figure 6:
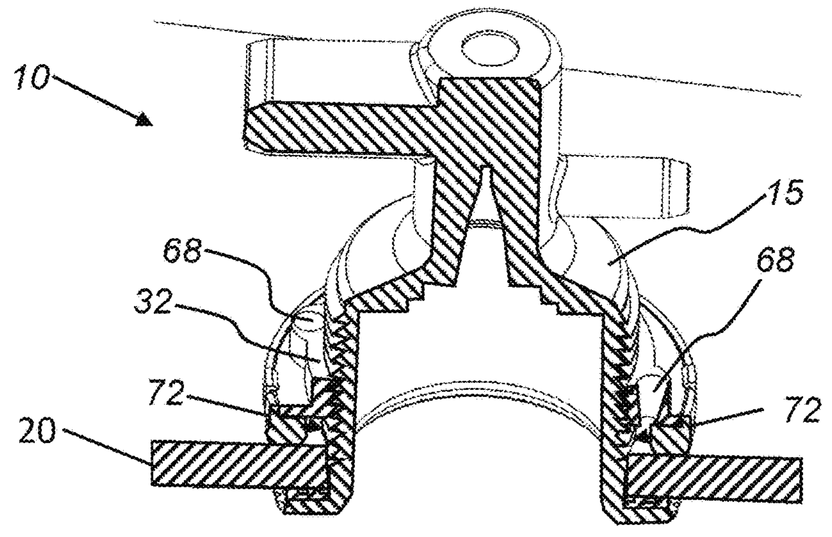
FIG. 6 is a perspective cross-sectional view of the exemplary system of FIG. 1.
Figure 7:
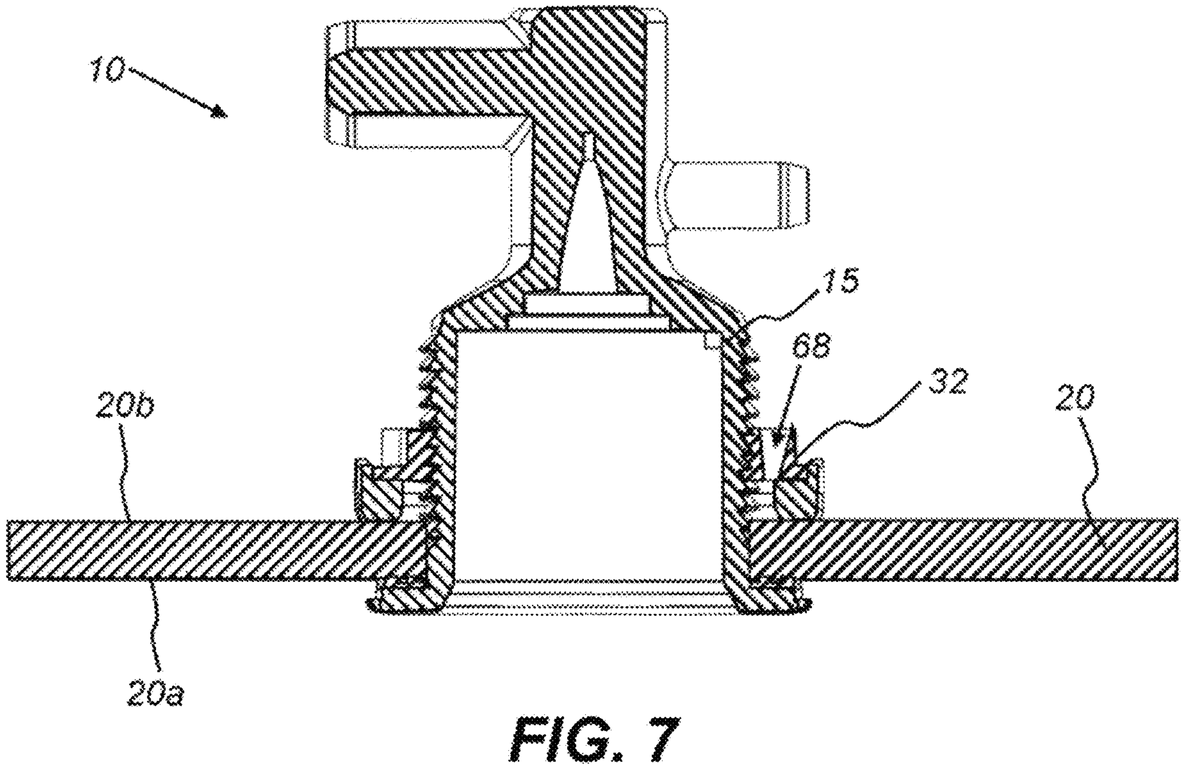
FIG. 7 is a plan view of the cross-sectional of FIG. 6.

FIG. 5 is an exemplary retaining member 32. Retaining member 32 is shown as a threaded nut or tension nut with internal threads 62 for mating with threads 49 of the through-component body 15. Other configurations could be used as a retaining member 32 to secure the through-component body 15 to the outer side 20*b* of spa shell 20. For example, the retaining member 32 could be another shape and include locations for screws or other securing means to attach the retaining member 32 to the through-component body 15. In another configuration, the retaining member 32 includes a clip interface that securely attaches to the through-component body 15 when pressed over the through-component body 15.

Retaining member 32 can similarly be manufactured to include additional components such as a nut with an overmolded gasket, etc. Optional opposing tabs 64 allow for tool-less installation of the retaining member 32 onto the through-component body 15. Proximal flange 60 of the retaining member 32 is received within channel 55 of the spacer 28. Proximal flange 60 may extend outwardly for a greater distance or a lesser distance, or can be a non-contiguous flange or a flange with gaps or holes therein. In other configurations, the retaining member 32 does not include a proximal flange 60.

Retaining member 32 includes at least one injection port 68 for injecting a sealant into the retaining member 32. In another configuration of the system 10, rather than the retention member 32 including the injection ports 68 for injecting sealant, the through-component body 15 itself may include the injection ports 68 for injecting sealant. In other configurations, the injection port(s) 68 may be provided in other components such as the spacer 28, etc. The exemplary configuration shown in FIG. 5 includes exactly two injection ports 68 integral to the retaining member 32. Fewer or more injection ports 68 may be used.

In FIG. 5, the two injection ports 68 are spaced equidistant apart from each other. One injection port 68 may be used to inject a sealant, and the other injection port 68 may be used to vent air as the sealant fills in any gaps between the threads of the through-component body, the retaining member 32, and/or the spacer 28. With two injection ports 68 spaced equidistant apart, the sealant can be forced through the entire circumference of the retaining member 32 (from the first injection port 68 to the second injection port 68) before it runs out the injection ports 68, thus filling the entire space of the retaining member 32, and/or the space between the spa shell 20 (e.g., the outer side 20*b*) and the through-component body 15. Injection ports 68 with different spacing may allow the sealant to run out of the retaining member 32 along the shortest distance between injection ports 68.

Injection port(s) 68 are sized to receive sealant, and may be large enough for convenient injection/application of sealant, but small enough to ensure adequate pressure on the sealant being injected. Pressure on the sealant helps to ensure that the sealant is forced into any spaces between the through-component body 15, the retaining member 32, the spacer 28, and/or the shell 20. With enough pressure, the sealant can also be forced between the spa shell 20 and the flange 40 on the proximal end 35 of the through-component body 15 (but not past gasket 24 to visibly leak out onto the inner side 20*a* of the spa shell 20, which would require removal of excess sealant during the manufacturing process). If the injection port(s) 68 are too large, there may not be enough pressure to drive the sealant into these small spaces before the sealant runs out the opposite injection port. Alternatively, if the injection ports 68 are too small, the sealant can be forced into undesired spaces before it runs out the opposite injection port.

Suitable sealants include acrylic adhesives, methylmethacrylate adhesives (MMA), and other anaerobic adhesives. Epoxy, 2-part epoxies, silicone, UV-curing adhesives, and other adhesives are used in other configurations.

Optionally, the system 10 may include a compensation ring, which are known in the art. A compensation ring can correct for any misalignment in the spa shell 20, and bring the connection for the retaining member 32 into a parallel position with respect to the spa shell 20. A compensation ring can be a separate element, or the compensation ring can be integrated with another component such as a gasket 24, the retaining member 32, etc. In other configurations, a compensation ring is not provided.

Figure 9:
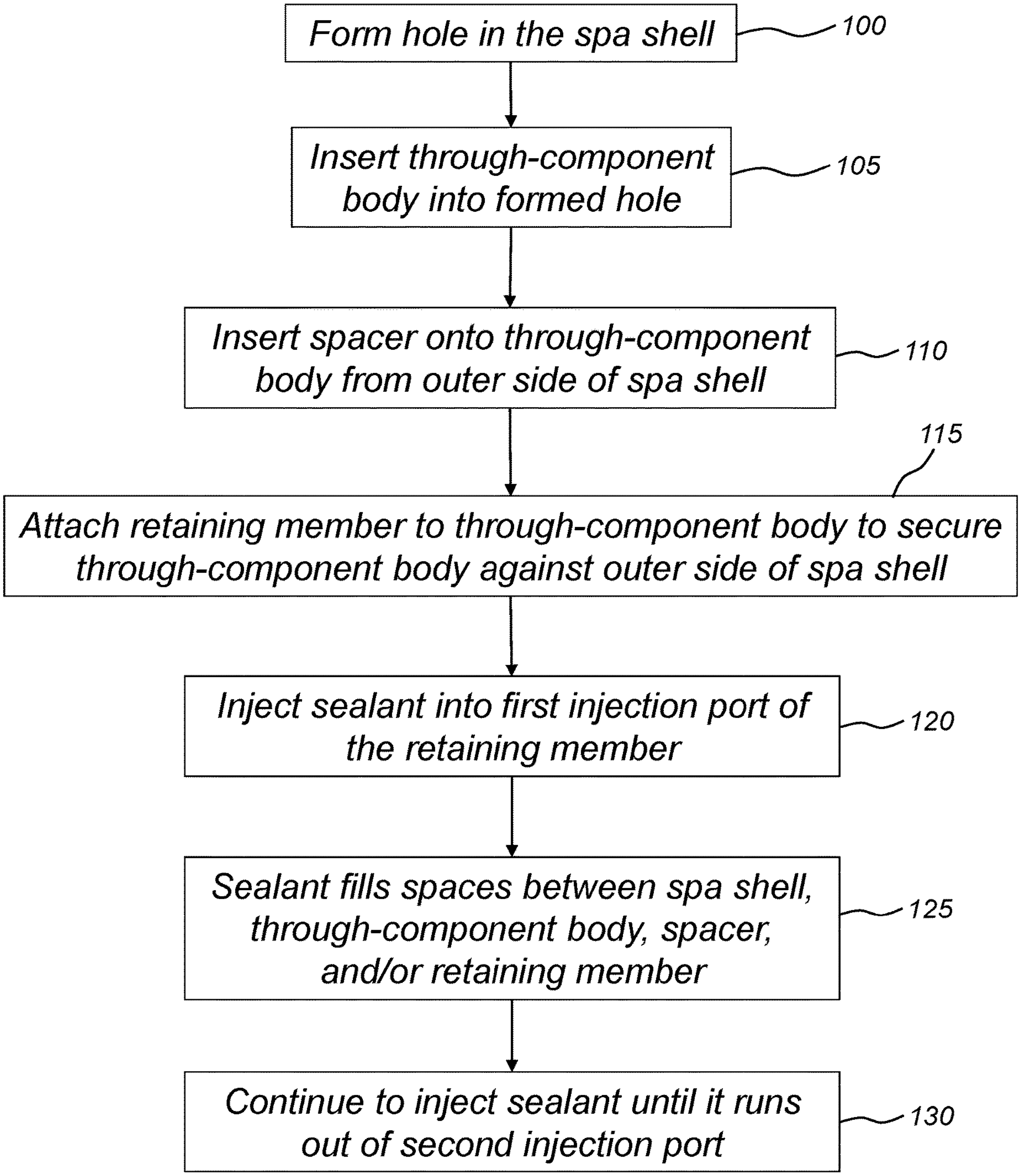
FIG. 9 is a flow chart of an exemplary method for sealing a through-component body in a spa shell.

FIG. 9 details an exemplary method of use. A hole is first created in the spa shell 20, extending from the inner side 20*a* to the outer side 20*b* (step 100). The size of the hole will depend on the size of the through-component body 15 that is being installed on the spa shell 20. The hole is roughly the diameter of the through-component body 15, so the through-component body 15 may snugly fit through the hole in the spa shell 20.

Once the hole is formed, the through-component body 15 is inserted through the hole (step 105). A flange 40 (either integral to the through-component body 15 or provided as a separate component) on the proximal end 35 of the through-component body 15 holds the proximal end 35 of the through-component body 15 in place on the inner side 20*a* of the spa shell 20. An optional gasket 24 between the flange 40 and the inner side 20*a* of the spa shell 20 ensures a tight fit and no leakage of the sealant, applied as detailed below. Gasket 24 may be a separate element, or may be integral to the through-component body 15.

In configurations where a spacer 28 is used, optional step 110 includes inserting the spacer 28 from the outer side 20*b* of the spa shell 20 onto the through-component body 15 (i.e., onto the distal end 44). A retaining member 32 is then attached to the through-component body 15 to secure through-component body 15 against outer side 20*b* of spa shell 20 (step 115). For example, a retaining member 32 may be a nut and the through-component body 15 may have external threads 49. Or, the retaining member 32 can have locations for screw or other attachment means to connect to the through-component body 15.

Figure 8:
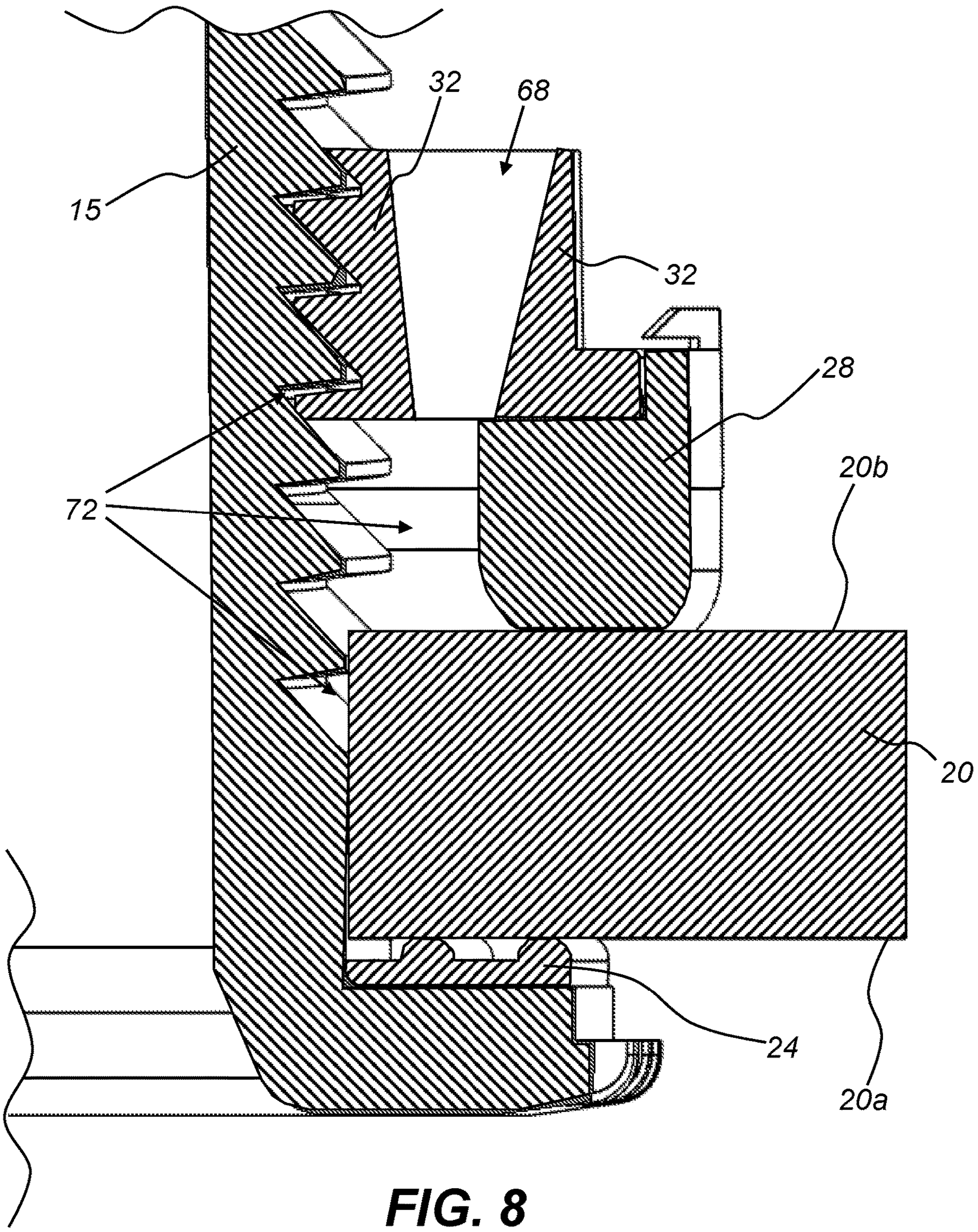
FIG. 8 is a close-up view of a portion of the cross-sectional view of FIG. 7.

After the retaining member 32 is in place, adhesive or sealant is then injected into a first injection port 68 of the retaining member 32 (step 120). In configurations where injection port(s) 68 are provided on other components (such as the through-component body 15 and/or the spacer 28, etc.), the adhesive or sealant is injected into such injection port(s) 68. The pressure on the sealant forces it into the spaces (such as space 72, FIG. 8) between the spa shell 20, the through-component body 15, the spacer 28, and/or the retaining member 32 (step 125). As the adhesive is injected into the first injection port and fills the spaces, it also runs to the second injection port (step 130), and air vents through the second injection port to minimize any air trapped into the adhesive.

While the method of use described above is provided in discrete steps in a particular order for the sake of clarity, the steps do not require a particular order and more than one step may be performed at the same time. For example, the adhesive may begin to be injected before the retaining member 32 is in place on the through-component body 15. While several components herein have been described as separate components, one or more components may be formed integrally to each other.

Aspect 1: A system for sealing a through-component in a spa shell, the system comprising: a through-component body, the through-component body comprising a proximal end for positioning on an inner side of the spa shell, the through-component body extending through the spa shell from the inner side of the spa shell to an outer side of the spa shell, the through-component body comprising a flange on the proximal end for engaging the inner side of the spa shell; a through-component gasket positioned between the flange and the inner side of the spa shell; a spacer positioned on the outer side of the spa shell, between the outer side of the spa shell and a nut; the nut, the nut comprising a first injection port and a second injection port, the first injection port and the second injection port spaced equidistant apart from each other, the nut for retaining the through-component body in place on the outer side of the spa shell, and the first injection port for injecting a sealant, and the second injection port for venting air and sealant.

Aspect 2: The system for sealing a through-component in a spa shell of Aspect 1, wherein the through-component body comprises at least one of: a jet body, a suction body, and a drain body.

Aspect 3: The system for sealing a through-component in a spa shell of Aspect 1 or Aspect 2, wherein the through-component gasket is integral to the through-component body.

Aspect 4: The system of any one of Aspects 1-3, further comprising a compensation ring between the spacer and the nut.

Aspect 5: The system of any one of Aspects 1-4, wherein the spacer comprises a gasket with a proximal portion made of a first plastic and a distal portion made of a second plastic, the first plastic being more resilient than the second plastic, the proximal portion for interfacing against the outer side of the spa shell, and the distal portion for interfacing with the nut.

Aspect 6: The system of Aspect 5, wherein the distal portion further comprises an outer lip extending upwardly and forming a channel to receive a proximal flange of the nut.

Aspect 7: The system of Aspect 5 or Aspect 6, wherein the spacer further comprises at least one locking member to lock the nut into place against the spacer.

Aspect 8: The system of any one of Aspects 1-7, further comprising a sealant, the sealant to seal a space between the outer side of the spa shell and the through-component body.

Aspect 9: A system for sealing a through-component in a spa shell, the system comprising: a through-component body, the through-component body comprising a proximal end for positioning on an inner side of the spa shell, the through-component body extending through the spa shell from the inner side of the spa shell to an outer side of the spa shell; a retaining member, the retaining member comprising at least one injection port, the retaining member for retaining the through-component body in place on the outer side of the spa shell, and the at least one injection port for injecting a sealant therein to seal a space between the outer side of the spa shell and the through-component body.

Aspect 10: The system of Aspect 9, wherein the through-component body comprises a flange on the proximal end for engaging the inner side of the spa shell.

Aspect 11: The system of Aspect 10, further comprising a through-component gasket positioned between the flange and the inner of the spa shell.

Aspect 12: The system of any one of Aspects 9-11, further comprising a spacer positioned on the outer side of the spa shell, between the outer side of the spa shell and the retaining member.

Aspect 13: The system of any one of Aspects 9-12, wherein the retaining member comprises a nut.

Aspect 14: The system of any one of Aspects 9-13, wherein the retaining member comprises at least two injection ports comprised of a first injection port and a second injection port, the first injection port and the second injection port spaced equidistant apart from each other.

Aspect 15: A method for sealing a through-component in a spa shell, the method comprising: forming a hole in the spa shell sized to fit a through-component body; inserting the through-component body through the hole, the through-component body passing from an inner side of the spa shell to an outer side of the spa shell; attaching a retaining member to the through-component body on the outer side of the spa shell to secure the through-component body in place, the retaining member comprising at least one injection port; and injecting a sealant into the at least one injection port.

Aspect 16: The method of Aspect 15, wherein the method further comprises attaching a retaining member that comprises a first injection port and a second injection port.

Aspect 17: The method of Aspect 16, wherein injecting a sealant into the at least one injection port comprises injecting a sealant into the first injection port until the sealant runs out of the second injection port.

Aspect 18: The method of any one of Aspects 15-17, wherein the method further comprises inserting a spacer onto the outer side of the spa shell, between the outer side of the spa shell and the retaining member.

Aspect 19: The method of any one of Aspects 15-18, wherein the retaining member comprises a nut and the through-component body comprises threads, and wherein attaching a retaining member comprises threading the nut onto the threads of the through-component body.

Aspect 20: The method of any one of Aspects 15-19, wherein injecting an adhesive into the at least one injection port comprises injecting the sealant into a space between the outer side of the spa shell and the through-component body.

Aspect 21: A system for sealing a through-component in a spa shell, the system comprising: a through-component body, the through-component body comprising a proximal end for positioning on an inner side of the spa shell, the through-component body extending through the spa shell from the inner side of the spa shell to an outer side of the spa shell; a retaining member, the retaining member for retaining the through-component body in place on the outer side of the spa shell; and a gasket positioned on the outer side of the spa shell, between the outer side of the spa shell and the retaining member, the gasket comprising at least one injection port, and the at least one injection port for injecting a sealant therein to seal a space between the outer side of the spa shell and the through-component body.

Although the foregoing disclosure provides many specifics, such as use of the system in spas, it will be appreciated that pools, and other water holding devices are contemplated and these should not be construed as limiting the scope of any of the ensuing claims. Other embodiments and configurations may be devised which do not depart from the scopes of the claims. Features from different embodiments and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

Furthermore, if any references have been made to patents and printed publications throughout this disclosure, each of these references and printed publications are individually incorporated herein by reference in their entirety.

The invention claimed is:

1. A system for sealing a through-component in a spa shell, the system comprising:

a through-component body, the through-component body comprising a proximal end for positioning on an inner side of the spa shell, the through-component body extending through the spa shell from the inner side of the spa shell to an outer side of the spa shell, the through-component body comprising a flange on the proximal end for engaging the inner side of the spa shell, the through-component body being in direct contact with the spa shell;

a through-component gasket positioned between the flange and the inner side of the spa shell;

a spacer positioned on the outer side of the spa shell, between the outer side of the spa shell and a nut, the spacer comprising a gasket with a proximal portion made of a first plastic and a distal portion made of a second plastic, the first plastic being more resilient than the second plastic, the proximal portion for interfacing against the outer side of the spa shell, and the distal portion for interfacing with the nut, the distal portion comprising an outer lip extending upwardly and forming a channel to receive a proximal flange of the nut; and the nut, the nut comprising a first port and a second port, the first port and the second port spaced equidistant apart from each other, the nut for retaining the through-component body in place on the outer side of the spa shell, and the first port for injecting a sealant and the second port for venting air and sealant.

2. The system of claim 1, wherein the through-component body comprises at least one of: a jet body, a suction body, and a drain body.

3. The system of claim 1, wherein the through-component gasket is integral to the through-component body.

4. The system of claim 1, wherein the spacer further comprises at least one locking member to lock the nut into place against the spacer.

5. The system of claim 1, further comprising a sealant, the sealant to seal a space between the outer side of the spa shell and the through-component body.

6. A system for sealing a through-component in a spa shell, the system comprising:

a through-component body, the through-component body comprising a proximal end for positioning on an inner side of the spa shell, the through-component body extending through the spa shell from the inner side of the spa shell to an outer side of the spa shell, the through-component body comprising a flange on the proximal end for engaging the inner side of the spa shell;

a through-component gasket positioned between the flange and the inner side of the spa shell;

a spacer positioned on the outer side of the spa shell, between the outer side of the spa shell and a nut, the spacer comprising a gasket with a proximal portion made of a first plastic and a distal portion made of a second plastic, the first plastic being more resilient than the second plastic, the proximal portion for interfacing against the outer side of the spa shell, and the distal portion for interfacing with the nut; and the nut, the nut comprising a first port and a second port, the first port and the second port spaced equidistant apart from each other, the nut for retaining the through-component body in place on the outer side of the spa shell, and the first port for injecting a sealant and the second port for venting air and sealant.

7. A method for sealing a through-component in a spa shell, the method comprising:

forming a hole in the spa shell sized to fit a through-component body;

inserting the through-component body of claim 1 through the hole, the through-component body passing from an inner side of the spa shell to an outer side of the spa shell;

attaching the nut of claim 1 to the through-component body on the outer side of the spa shell to secure the through-component body in place; and injecting a sealant into the first port.

8. The method of claim 7, wherein injecting a sealant into the first port comprises injecting the sealant into the first port until the sealant runs out of the second port.

9. The method of claim 7, wherein the method further comprises inserting the spacer onto the outer side of the spa shell, between the outer side of the spa shell and the nut.

10. The method of claim 7, wherein the through-component body comprises threads, and wherein attaching the nut comprises threading the nut onto the threads of the through-component body.

11. The method of claim 7, wherein injecting the sealant into the first port comprises injecting the sealant into a space between the outer side of the spa shell and the through-component body.

* * * * *